STRIP RECORD MEDIUM CONTACT BELT DRIVEN TRANSPORTS

Filed Oct. 10, 1968 3 Sheets-Sheet 1

*INVENTORS*
DALE D. DECKER
DANIEL M. ROBERTS

*BY* George E. Roush

ATTORNEY

United States Patent Office 3,514,049
Patented May 26, 1970

3,514,049

STRIP RECORD MEDIUM CONTACT BELT DRIVEN TRANSPORTS

Dale Darwin Decker, San Jose, and Daniel Martin Roberts, Saratoga, Calif., assignors to International Business Machines Corporation, Armonk, N.Y., a corporation of New York Filed Oct. 10, 1968, Ser. No. 766,424
Int. Cl. G03b *1/04;* G11b *15/32, 23/04*
U.S. Cl. 242—192 12 Claims

ABSTRACT OF THE DISCLOSURE

In a transport for a strip record medium (such as magnetic or paper tape or photographic film or similar strip record medium) of the self threading reel-to-reel typ driven by a belt looped over a drive capstan and the magnetic tape on the reels, a sealed supply reel is released from the drive belt for removal from and replacement on the transport by interposing a resilient band between the supply reel and the drive belt to locate them slightly beyond the periphery of the supply reel. The supply reel is arranged with a recessed finger grip about the hub for ease in the removal and replacement of the sealed supply reel when released from the drive belt. Automatic threading is enhanced by a wobblable flange on the takeup reel accommodating a leader wider than the tape in opposing annular grooves in the flanges about the hub of the takeup reel.

The invention relates to self threading strip record medium transports of the type wherein a drive belt is in contact with the strip record on record storage reels. It particularly pertains to mechanisms for releasing a sealed supply reel from the drive belt for removal from and replacement in the transport and for threading the strip record from the supply reel onto a takeup reel over the hub of which the drive belt is looped.

Strip record medium contact belt driven transports are known for use with photographic film, paper tape, and cloth music player rolls, but the principal development of these transports has been in the field of magnetic tape recording and reproducing apparatus. For the most part, only a few of these transports have featured interchangeable tape reels or self threading mechanisms. Examples of U.S. patents pertinent to these developments are:

| | | | |
|---|---|---|---|
| 2,743,878 | 5/1956 | Masterson | 242—55 |
| 3,125,311 | 3/1964 | Willis | 242—55.14 |
| 3,208,688 | 9/1965 | Hanes | 242—74.2 |
| 3,305,186 | 2/1967 | Burdorf et al. | 242—55.12 |
| 3,330,496 | 7/1967 | Tatter et al. | 242—74.2 |
| 3,348,784 | 10/1967 | Gardiner et al. | 242—55.12 |

The prior art transports which are arranged to some extent for reel interchange and self threading suffer from a number of disadvantages. In one known arrangement, a plurality of translatable pins are arranged to draw out a considerable length of drive belt in order to free the reel for removal. In another arrangement, one or both reels are swung along arcs to the same end. The additional length of drive belt necessary is such that there is considerable difficulty in maintaining the proper tension during the recording and reproducing operation. Prior art self threading arrangements operate with difficulty also.

According to the invention, the objects indirectly referred to hereinbefore and which will appear as the specification progresses are attained in a strip record medium transport comprising supply and takeup reels, a length of strip record medium wound at least on the supply reel and to be wound partly on the takeup reel, a drive capstan, and a drive belt. The latter is looped about the supply reel in contact with the strip record medium, the takeup reel, the drive capstans and a tensioning mechanism. Ready removal and replacement of a sealed strip record medium reel obtains by means of a resilient band which is interposed between the drive belt and the supply reel to bring them out beyond the periphery of the supply reel. With this arrangement, it is only necessary to increase the length of the drive belt in the vicinity of the supply reel by a small amount which is made available by a small change in position of the tensioning mechanism. In one practical embodiment, according to the invention, the band is sufficiently stiff as to take up a circular configuration around the supply reel determined by a band guiding arm rotatable about the center of rotation of the supply reel. In another embodiment, the band is guided in a circular track structure. By employing both means, friction is reduced to a very small amount rendering easy and rapid operation.

The structure, according to the invention, is very useful with, but not limited to, a self sealing strip record medium pack of the type wherein a leader on the strip record medium is forced into annular slots in the reel flanges to seal the pack as a unit. Such a reel of magnetic tape is shown and described in U.S. Pat. 3,363,853 of Ronald Duane Irvin, issued Jan. 16, 1968 for "Strip Record Medium Transporting Apparatus."

Further, according to the invention, the supply reel is formed with one or more depressions about the hub of the reel so that the thumb and fingers of an operator's hand may be inserted to grasp the reel about the hub for removal and replacement. Preferably, a retrograde taper and/or a textured surface is provided in the gripping area of this reel.

Further, according to the invention, automatic threading is enhanced by means of a takeup reel having a lower rigid flange with a hub affixed centrally and an upper flange wobblably mounted on the hub. Opposed annular grooves in the flanges adjacent the hub capture the leader on the strip record medium, which is wider than the strip record medium, as the upper flange wobbles in response to the contact of the leader being urged about the hub by the drive belt.

Further, according to the invention, a strip record medium transport as described is enclosed in an outer housing having an access port through which the supply reel is inserted and removed, which port is covered by a door at all times except when the supply reel is released from the belt. Drum and cord arrangements, geared arrangements, and cam and follower arrangements are contemplated for this function.

In order that the advantages of the invention may be readily attained in practice, a description of a preferred embodiment of the invention is given hereafter, by way of example only, with reference to the accompanying drawing forming a part of the specification and in which.

Figure 1:
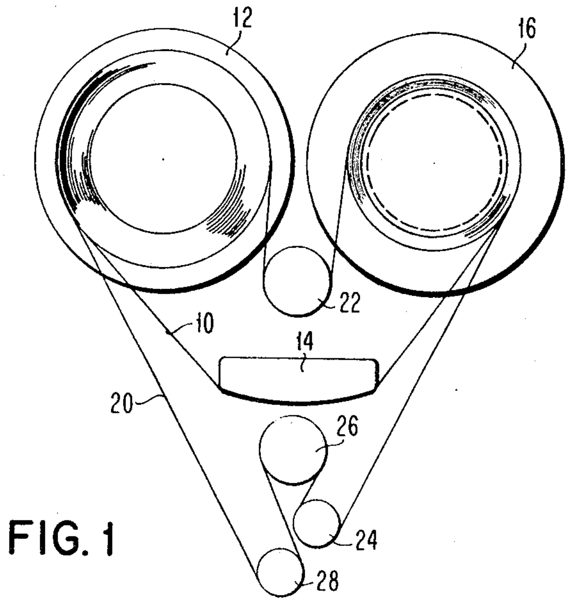
FIG. 1 is a schematic diagram of a fundamental arrangement of a strip record medium transport of the contact belt drive type.

Referring to FIG. 1, a known configuration of strip record medium transport is shown schematically. This configuration is most frequently used with magnetic tape as the strip record medium and both it and the embodiments of the invention will be so described with the clear understanding that other strip record media may be transported according to the invention by those skilled in the art. A length of magnetic tape 10 wound on a supply reel 12 is guided past an electromagnetic transducer 14 and wound on a takeup reel 16. The tape 10 is transported by means of a driving belt 20 passing over the tape on the supply reel 12, a roller 22, the tape on the takeup reel 16, a roller 24, another roller 26 and a further roller 28. The roller 22 is most frequently constituted by a drive capstan and arranged as shown to insure a large area of contact between the driving belt 20 and the tape 10 on the reels 12 and 16. At the same time, one or both rollers 24 and 28 are arranged in known fashion to maintain substantially constant tension in the belt 20. The roller 26 is frequently an idler roller but in some arrangements, the roller 26 is also constituted by an additional drive capstan, with the rollers 24 and 28 arranged to insure a large area of contact of the tape 20 with the drive capstan. In the latter case the peripheral speeds of the drive capstans 22 and 26 differ by a small percentage (the capstan 22 being the faster) so that constant tension is maintained in the tape 10 as it passes over the electromagnetic transducer 14.

Interchanging reels of tape in this fundamental arrangement is cumbersome. In one prior are arrangement, pins normally out of the way of belt are moved with respect to a reel to draw out a large length of the belt completely freeing the reel for removal. In another prior art arrangement, one or both of the reels are arranged on arms which are pivoted to remove the reels from contact with the driving belt. Both of these arrangements require belts of excessive length and means for taking up that excessive length during the normal reproducing and recording operation. Such excessive lengths multiply the difficulties in maintaining the desired tension in the drive belt and the tape and, at the same time, increase the cost of the structure of the tape transport.

Figure 2:
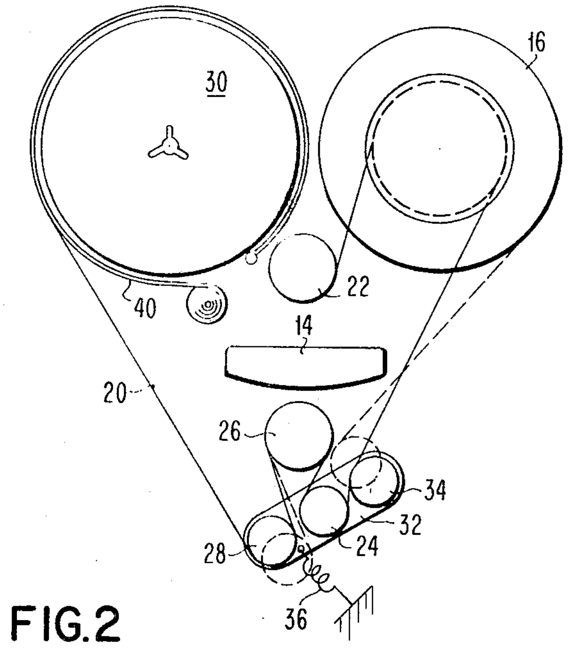
FIG. 2 is a schematic diagram of an arrangement according to one aspect of the invention for ready removal and replacement of a sealed supply reel.

FIG. 2 schematically illustrates the concept of the invention for interchanging supply reels. A tape pack 30 is shown in place as a supply reel with all of the magnetic tape wound thereon and preferably sealed by a leader. A tension roller arm 32 carries the rollers 24 and 28 and and an additional belt tensioning roller 34. Constant tension is maintained by a spring 36 of the type known by the registered trademark "Flex'ator" of the Hunter Spring Company. The arm 32 is shown in the position for removing the tape pack 30, brought about by interpositioning a flexible or resilient band 40 between the driving belt 20 and the tape pack 30 so that the band 40 and the driving belt 20 are located a small distance beyond the outer periphery of the tape pack 30. The tape pack 30 may be readily removed and replaced by another tape pack. Only a very small additional length of drive belt 20 must be drawn out to free it completely from the tape pack 30.

Figures 3, 4:
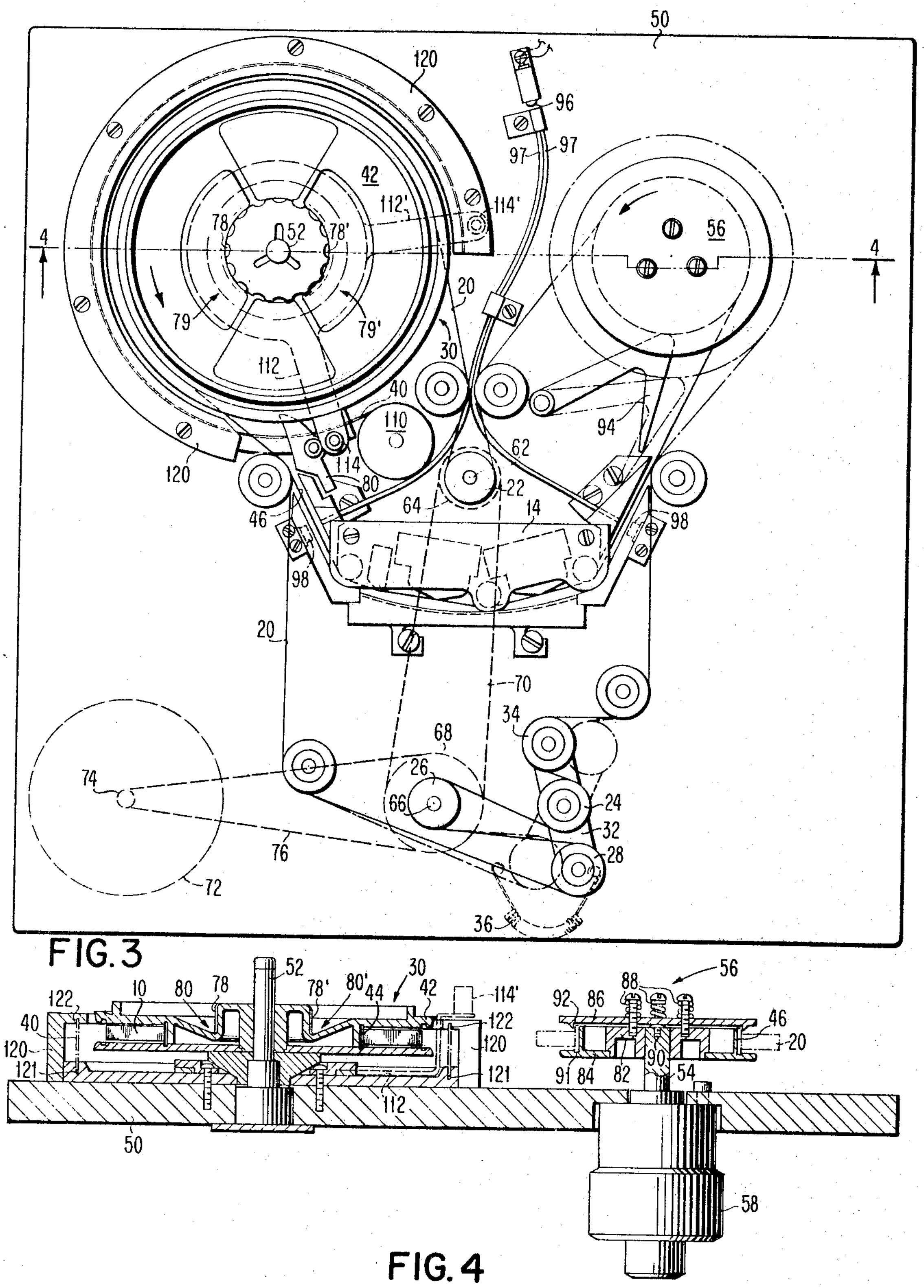
FIG. 3 is a plan view of a practical embodiment of the invention.
FIG. 4 is a cross section view of the embodiment illustrated in FIG. 3 taken along the line 4—4.

FIG. 3 is a plan view of a practical embodiment of the invention and FIG. 4 is a cross section view taken along the line 4—4. Whenever possible, like reference numerals have been retained in the interest of clarity. The invention is particularly embodied here in a dual capstan arrangement in which the fast capstan 22 has a peripheral velocity about two-tenths of one percent faster than the peripheral velocity of the slow capstan 26 but the invention is not limited to such an arrangement. Likewise, the invention is particularly embodied here in an arrangement using a tape pack 30 comprising a reel 42, a length of trailer 44 (sometimes omitted) a length of magnetic tape 10, and a tape pack leader 46 of the type wherein the leader is forced into annular slots in the flanges of the reel 42 to seal the tape pack 30 as a unit. However, the invention is not limited to such a tape pack arrangement.

A base plate 50 forms the main mechanical support for the unit with components mounted above and below as is convenient. A spindle 52 is arranged for receiving the supply reel 42 of the tape pack 30. A rotatable shaft 54 on which a takeup reel 56 is mounted passes through the base plate 50 for coupling to a motor and clutch arrangement 58 to be described more fully hereinafter. The fast capstan 22 is arranged on a capstan shaft which is journaled in the base plate 50 and carries a capstan pulley 64. Similarly, the slow capstan 26 is mounted on a capstan shaft 66 which extends through the base plate 50 and carries a slow capstan pulley 68. The capstan pulleys 64 and 68 are coupled by means of a non-slipping belt 70 and driven by a motor 72 having a motor drive pulley 74 on its shaft for propelling a belt 76 which directly turns one of the capstan pulleys 64 or 68. The drawing shows the belt 76 from capstan pulley 68 which is made wide enough to accommodate both belts 70 and 76. If the belt 70 is made of material that has some elasticity, it will be found that better results are obtained by turning the fast capstan pulley 64. The motor 72 may be a dual speed reversible motor so that threading and rewinding operation and high speed searching operations can take place at high speed with recording and reproducing operations better performed at a lower speed. Two motors are frequently used. In such case the motor 72 is a reversible high speed motor from which power is removed during low speed operation. The latter is obtained by means of a low speed motor driving a large pulley which also acts as a fly wheel. A clutch couples the fly wheel-pulley to the fast capstan for low speed drive. One single speed motor and two clutches can be operated in a dual reduction drive system to the same end. The capstan pulleys 64 and 68 are of different diameter, the ratio of which has been exaggerated in the drawing. Actually the diameters differ only to the extent that one capstan has a peripheral speed about two tenths of one percent faster than the other.

The supply reel 42 has two thumb and finger gripping surfaces 78, 78' of convenient height afforded by two depressions 79, 79' in the molding for facilitating removal and replacement of a sealed tape pack 30. The gripping surfaces 78, 78' are given a texture and/or a retrograde taper (not shown) enhancing the grip. Alternatively, the reel 42 may be molded with a single annular depression leaving a cylindrical or conical central knob, if desired.

The machine is shown in the drawing with the supply reel 42 in place on the spindle 52 after the leader 46 has been stripped off by a stripping spur 80. A length of the leader has been through the guide channel past the electromagnetic transducer 14 and the end partially wrapped around the hub of the takeup reel 56.

The takeup reel 56 has a hub 82 mounted on the shaft 54 and a bottom flange 84 of substantially rigid construction. A separate upper flange 86 is held on the hub 82 and urged to a position parallel with the lower flange 84 by three adjustable screw assemblies comprising springs 88. The springs 88 permit the upper flange 86 to tip about a spherical pivot pin 90 for which a complementary depression is provided in the lower inner face of the upper flange 86. Like the supply reel 42, the takeup reel 56 is constructed to provide opposing annular grooves 91 and 92 in the inner surfaces of the flanges about the periphery of the hub 82. These annular grooves 91 and 92 are of sufficient depth to accommodate the leader 46 with the flanges 84, 86 in normal parallel relationship. The upper flange 86 is formed with an annular surface tapered to facilitate the threading of the leader 46 into the grooves 91 and 92. The flanges of both reels are spaced axially by a distance a bit wider than the magnetic tape and the latter does not come into contact with any flange in the operation of the transport. The diameter of flanges 84, 86 is only a bit larger than that of the hub 82, because the convolutions of the tape 10 are readily held in place by the tension generated in the tape by action of the drive belt 20 without any support from below. In the threading operation, the upper flange 86 is tipped at the point where the full width of the leader 46 first engages the upper flange 86. This rising action continues around the upper flange 86 as the leader 46 is urged into the grooves 91 and 92 by the action of the driving belt 20. The action of the upper flange 86 in so moving is best described as wobbling and the flange 86 is commonly referred to as a wobblable flange. The takeup reel 56 according to the invention with the wobblable flange 86 was developed to overcome the shortcomings of prior art reels such as the type wherein the upper flange is free to move up and down but constrained to remain parallel to the lower flange. In an extensive test, there were no failures in threading due to the wobblable flange.

The leader threading guide walls are of conventional form except for a pivoted section 94 arranged to insure that the leader passes to the side of the takeup reel hub 82 that is in contact with the drive belt 20 as it enters the takeup reel 56. A pivot spring urges the knee of the movable guide wall section 94 into very light contact with the hub of the takeup reel 56 or the magnetic tape 10 which is wound over it.

Light from a lamp 96 is carried by light pipes 97 to the leader guide walls opposite cooperating photo diodes 98 for conventional operation in automatically threading the leader 46 and the tape 10.

The flexible or resilient band 40 for extending the drive belt 20 out beyond the periphery of the supply reel 42 is shown retracted into ar etainer 110. An example of such a flexible band is a spring known by the registered trademark "Neg'ator" of the Hunter Spring Company. A band guiding arm 112 is pivoted about the spindle 52. This operating arm 112 lies horizontal for the most part but near the outer end there is a vertical rising section having an extension extending to the path of and coinciding with the width of the flexible band 40, to which extension the flexible band 40 is attached. The operating arm 112 is moved by means of an operating handle 114 approximately 270 degrees clockwise for expanding the drive belt 20. The arm 112 and handle 114 are shown in this terminal position in broken lines and with primed reference numerals. Only this terminal position is shown in the cross section view. In operation, the guiding arm 112 first strikes the stripping spur 80, removes it from within the flanges of the supply reel 42 and holds it away from the reel 42. It is contemplated that a band 40 of sufficient stiffness can be guided around by the guiding arm 112 to hold the drive belt 20 away from the supply reel 42 of the tape pack 30 by its own characteristic. A flexible band guiding housing 120 generally annular configuration is arranged with annular grooves 121 and 122 in which the flexible band 40 rides. The upper part of the housing 120 extends over an angle of approximately 250 degrees while the part with the lower groove 121 extends to the band retainer 110. With this housing 120, a thinner, more flexible band 40 may be used. The more flexible bands are more readily obtainable on the market and are retractable into smaller band retainers 110. Preferably, both the arm 112 and the housing 120 are used for the best results.

Motor drive of the operating arm 112 is contemplated. A tubular shaft concentric with the lower end of the spindle 52 is coupled to the operating arm 112 and extends through the base plate 50 to a suitable motor drive arrangement preferably with reduction gearing, so that the flexible band 40 is drawn around the housing 120 and retracted by simply closing an electric switch. Conventional travel limiting techniques would be used to prevent malfunction.

Not shown but contemplated are interlocked switches arranged so that the flexible band 40 may not be retracted without a reel 42 being in place on the spindle 52.

In the threading operation, the leader 46 is pushed through the leader guide walls to the takeup reel 56. As soon as the leader reaches the takeup reel 56, the drive belt 20 captures the leader 46 and winds it tightly about the hub 82 of the takeup reel 56. However, after the transport is threaded by pushing the leader, and before pulling, the tape by the transducer 14 there is a bit of slack in the leader 46 and/or the attached magnetic tape 10. This initial slack is taken up by the takeup reel loading motor 58 which is energized momentarily at the beginning of the loading operation. After the slack is out, power is removed and the motor 58 is uncoupled from the system by means of a clutch which removes the inertia of the motor from the takeup reel during normal operation. The motor 58 may be directly connected to the takeup reel drive shaft 54 where the motor turns at a speed slightly faster than the drive belt 20 while energized. Preferably, a pulley and belt arrangement is arranged to drive the takeup reel 56 until the slack has been entirely taken up at which time the motor stalls until it is unclutched. The optical system comprising the light 96 and the photosensors 98 are also arranged to insure that the takeup reel motor 58 is turned off after threading operation is completed.

Figure 5:
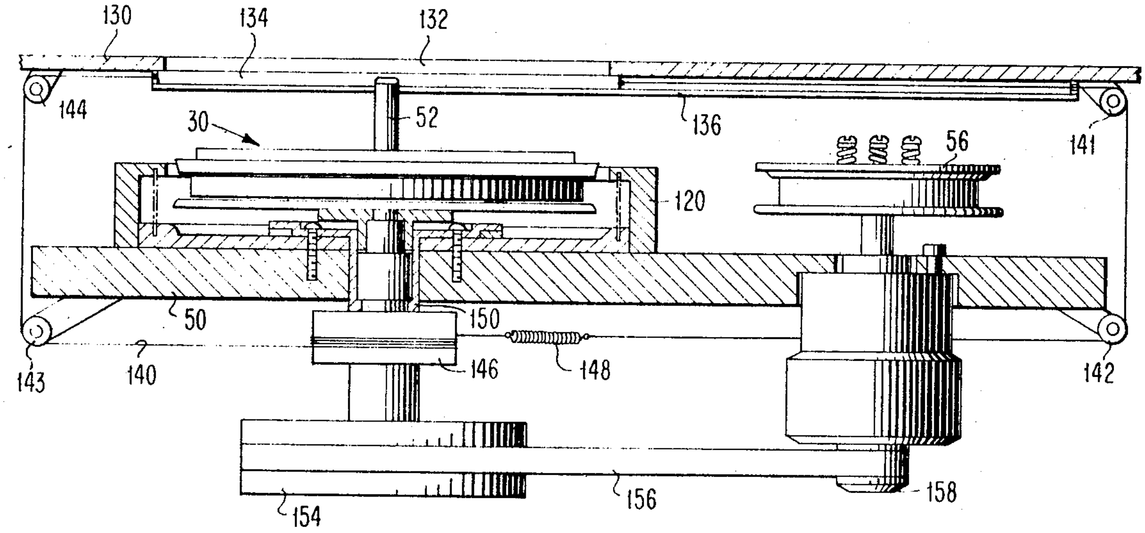
FIG. 5 is an illustration of one means for opening and closing an access door according to the invention.

FIG. 5 illustrates one embodiment incorporating protection for the tape pack 30 while the transport is in operation. The transport is enclosed in a cabinet having an upper wall 130 shown in cross section and in which there is a tape pack access port 132. This port is covered by a door 134 at all times except when removing and replacing a tape pack 30. The door 134 slides in a track of which only one rail 136 is shown fastened to the wall 130. A cord 140, passing over a suitable number and arrangement of pulleys 141–144, is wound on a drum 146 under the tension of a spring 148 and terminates at either end of the door 134. A sleeve 150 is connected to the band guiding arm 112 and extends through suitable bearing structure below the base plate 50 where the drum 146 and a large pulley 154 are affixed. A belt 156 about the large drive pulley 154 drives the sleeve at a low rate due to the ratio of the pulley 154 to a drive pulley 158 on a motor conveniently shown as the motor 58. Preferably, a suitable clutching mechanism is arranged in known manner so that this takeup reel motor can be used to drive the band guiding arm 112 and operates the door 134, although a separate motor obviously can be used.

While the invention has been described in terms of a preferred embodiment, it should be clearly understood that those skilled in the art will make changes in form and material without departing from the spirit and scope of the invention.

The invention claimed is:

1. A strip record medium transport, comprising:
- a supply reel,
- a takeup reel,
- a length of said strip record medium wound at least on said supply reels and to be wound partly on said takeup reel,
- a drive capstan,
- a drive belt looped about said supply reel in contact with said strip record medium, said takeup reel and said drive capstan, and
- a band arranged to be interposed between said drive belt and said supply reel to bring said drive belt out beyond the periphery of said supply reel, whereby said supply reel and strip record medium may be removed from and replaced on said transport.

2. A strip record medium transport as defined in claim 1 and wherein:
said band is a negator spring.

3. A strip record medium transport as defined in claim 1 and wherein:
a band guiding arm rotatable about the center of rotation of said supply reel is affixed to said band.

4. A strip record medium transport as defined in claim 1 and wherein:
an annular housing is arranged about at least a part of said supply reel,
said housing having opposing annular grooves therein in which said band is guided.

5. A strip record medium transport as defined in claim 4 and wherein:
a band guiding arm is also arranged on the end of said band for increased stability of a manual operating handle.

6. A strip record medium transport as defined in claim 1 and wherein:
a pivoted stripping spur is normally urged into said supply reel and is brought out beyond the periphery of said supply reel by interposition of said band.

7. A strip record medium transport as defined in claim 4 and wherein: :
an operating handle is affixed to one end of said band and protrudes through said housing.

8. A strip record medium transport as defined in claim 7 and wherein:
a movable cover plate is arranged over said supply reel for normal operation and is moved away by operation of said handle.

9. A strip record medium transport as defined in claim 3 and wherein:
said band guiding arm is motor driven.

10. A strip record medium transport as defined in claim 9 and wherein:
a cover plate is movably arranged over said supply reel in operation and moved away by operation of said motor driven band guiding arm.

11. A strip record medium transport as defined in claim 1 and wherein:
said supply reel has a depression about said hub for manually griping said supply reel.

12. A strip record medium transport as defined in claim 1 and wherein:
said takeup reel comprises:
a hub,
one flange affixed to said hub, and
another flange wobblably mounted on said hub.
said flanges having opposed annular grooves therein,
whereby a leader on said strip record medium wider than said strip record medium is captured in said grooves as said other flange wobbles in response to urging of said leader.

References Cited

UNITED STATES PATENTS

| | | | |
|---|---|---|---|
| 3,114,512 | 12/1963 | Peshel et al. | 242—192 |
| 3,125,311 | 3/1964 | Willis | 242—192 |
| 3,297,268 | 1/1967 | Sawazaki | 242—192 |
| 3,305,186 | 2/1967 | Burdorf et al. | 242—192 |
| 3,330,496 | 7/1967 | Tatter et al. | 242—74.2 |
| 3,348,784 | 10/1967 | Gardiner et al. | 242—196 |
| 3,341,140 | 9/1967 | Kjos | 242—192 |

LEONARD D. CHRISTIAN, Primary Examiner

U.S. Cl. X.R.

242—74.2